United States Patent [19]

Marion

[11] Patent Number: 4,987,644
[45] Date of Patent: Jan. 29, 1991

[54] SHELL CUTTING METHOD FOR PROCESSING SHRIMP

[75] Inventor: Ronald J. Marion, Issaquah, Wash.

[73] Assignee: Fletcher Seafoods, Ltd., Seattle, Wash.

[21] Appl. No.: 507,712

[22] Filed: Apr. 10, 1990

[51] Int. Cl.$^5$ ............................................ A22C 25/00
[52] U.S. Cl. .................................................. 452/2; 452/5
[58] Field of Search ............................ 17/72, 52, 73

[56] References Cited

U.S. PATENT DOCUMENTS

| | | | |
|---|---|---|---|
| 3,238,561 | 3/1966 | Jonsson | 17/45 |
| 3,324,504 | 6/1967 | Lapeyre | 17/45 |
| 3,353,207 | 11/1967 | Weinberger | 17/7 |
| 3,600,744 | 8/1971 | Muller | 17/48 |
| 3,629,904 | 12/1971 | Zober et al. | 17/71 |
| 3,639,946 | 2/1972 | Welcker et al. | 17/71 |
| 3,691,591 | 9/1972 | Muller | 17/73 |
| 3,751,766 | 8/1973 | Jonsson | 17/71 |
| 3,867,740 | 2/1975 | Lapine et al. | 17/72 |
| 3,876,740 | 2/1975 | Lapine et al. | 17/72 |
| 3,952,371 | 4/1976 | Lapine et al. | 17/52 |
| 4,008,508 | 2/1977 | Lapine et al. | 17/52 |
| 4,054,970 | 10/1977 | Metzger et al. | 17/71 |
| 4,222,153 | 9/1980 | Schmidt | 17/73 |
| 4,393,543 | 7/1983 | Martin | 17/72 |
| 4,400,849 | 8/1983 | Dell | 17/73 |
| 4,414,709 | 11/1983 | Betts | 17/71 |
| 4,439,893 | 4/1984 | Betts | 17/72 |
| 4,692,965 | 9/1987 | Stephenson | 17/48 |
| 4,769,871 | 9/1988 | Betts | 17/48 |
| 4,816,276 | 3/1989 | Blazevich | 426/479 |

FOREIGN PATENT DOCUMENTS

| | | | |
|---|---|---|---|
| 7125368 | 6/1971 | France | 29/ |
| WO89/01715 | 4/1989 | PCT Int'l Appl. | 17/48 |
| 2150418 | 7/1985 | United Kingdom | 29/2 |
| 2165438 | 4/1986 | United Kingdom | 25/12 |

Primary Examiner—Frederick R. Schmidt
Assistant Examiner—John R. Schwarzmann
Attorney, Agent, or Firm—Christensen, O'Connor, Johnson & Kindness

[57] ABSTRACT

A shrimp processing method in which ventral and tails cuts are made in the shell of the shrimp. The ventral cut extends from the first body segment at least through the second to last body segment, and the tail cut extends from the tail through a portion of the first segment. The cuts facilitate removal of the shrimp meat from the shell by the consumer.

5 Claims, 1 Drawing Sheet

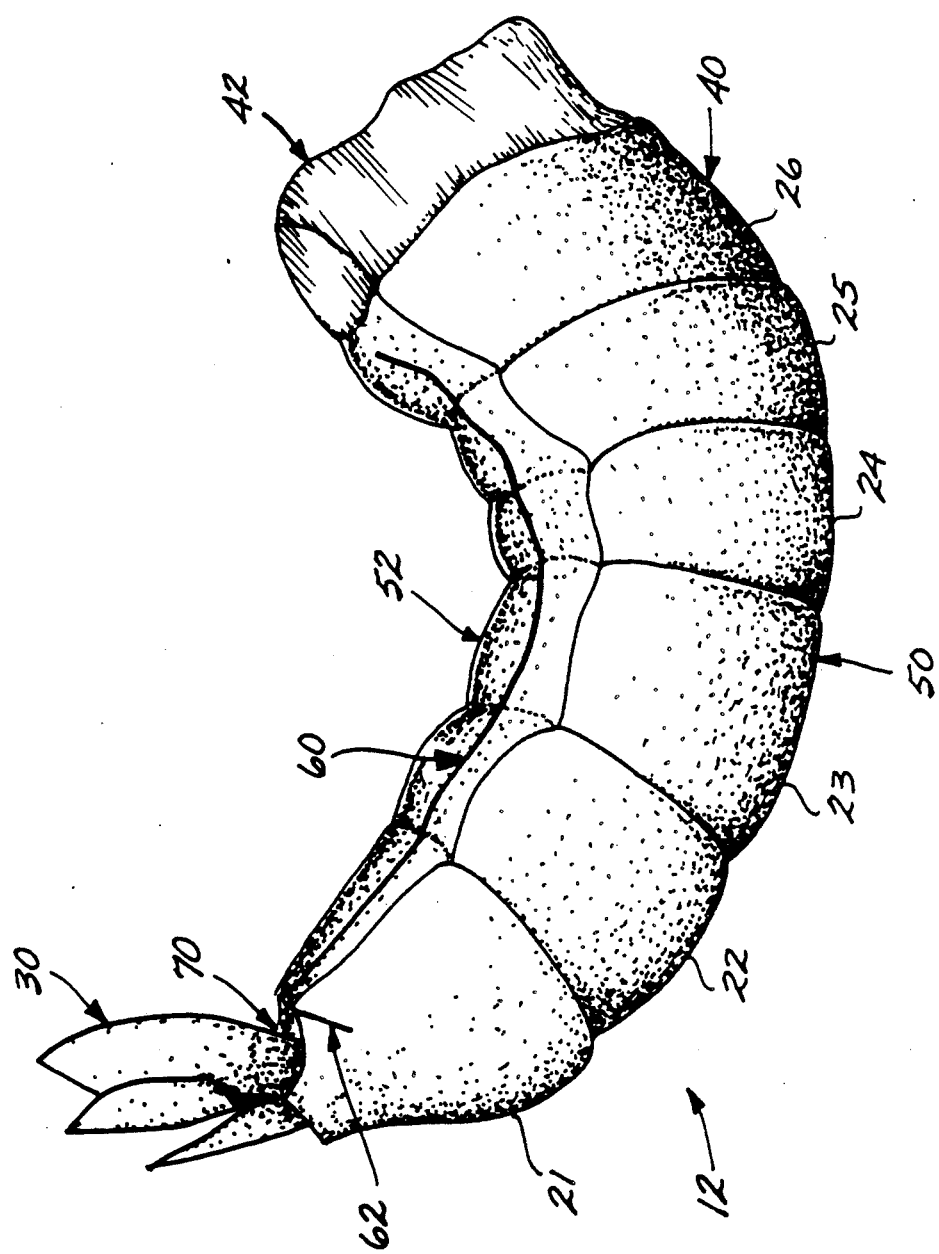

SHELL CUTTING METHOD FOR PROCESSING SHRIMP

FIELD OF THE INVENTION

The present invention relates to the processing of shrimp.

BACKGROUND OF THE INVENTION

A living shrimp includes a head and an adjacent body that includes the meat portion. The body is formed as a plurality (typically six) of interconnected segments. The tail of the shrimp is connected to the first segment, and the last segment is joined to the head at a region known as the thorax. The segments include a shell that surrounds and encloses the meat. The body and shell include a convex dorsal side, and a concave ventral side to which appendages known as swimmerettes are attached. A long vein, known as the sand vein, extends along the dorsal part of the body, just under the shell.

In a typical shrimp processing operation, the head and swimmerettes of the shrimp are removed, and the shell enclosing the body is then either cut and removed, or cut such that the consumer can readily remove the shell. Most commonly, the shell is cut along the dorsal surface during processing, so that the sand vein can also be removed. The removal of the head and swimmerettes, the deveining, and the shell cutting can either be done by hand, or by means of shrimp processing devices of suitable structure.

One known technique for deveining a shrimp is to make a small cut through the dorsal portion of the shell, and then remove the vein using a pin or similar instrument. However the vein often breaks during such a process, leaving a portion of the vein in place. In a second technique, the shrimp is cut along the full length of its dorsal body portion, and the vein removed either at the same time, or in a subsequent step. However, cutting along the full length of the shrimp's dorsal side causes the shrimp's body to expand and deform.

SUMMARY OF THE INVENTION

The present invention provides a method for cutting the shell of a shrimp, in order to facilitate removal of the meat by the consumer. In particular, the present invention provides for a ventral cut in the shell along the ventral side of the shrimp, and a tail cut in the side of the first segment. The ventral cut extends from the first segment at least through the second to last segment, and preferably through a portion of the last segment. The tail cut extends from adjacent the tail, and makes an acute angle with the ventral cut.

BRIEF DESCRIPTION OF THE DRAWING

The FIGURE illustrates the body of a shrimp, showing the location of the cuts according to the present invention.

DETAILED DESCRIPTION OF THE PREFERRED EMBODIMENT

Shrimp are commonly raised in ponds or reservoirs from which they are harvested when they reach the appropriate size. The steps taken during the harvesting and processing operations can vary, depending upon the final form the shrimp are to take when sold as a food item. However, one very common processing technique is to remove the head, sand vein and swimmerettes of the shrimp, and to then make one or more cuts through the shell in the shrimp body, to facilitate removal of the meat from the shell by the consumer. Although the invention primarily applies to a manual process, in which the cuts in the shell are done by hand, the same principles would also apply to an apparatus or device designed to perform the shell cutting operations.

An advantageous technique for removing the heads and sand veins of shrimp is to remove the head preferably within one hour, and in any case within one and one-half hours, after the shrimp are removed from the reservoir. If the head removal operation is performed within such time limit, then the sand vein of the shrimp can be removed in the same operation by then pulling the head directly away from the body. As the above-mentioned time limits are exceeded, there is an increasing tendency of the sand vein to break when the head is pulled away from the body, thereby leaving a portion of the sand vein in the shrimp body.

The FIGURE illustrates the body portion of a shrimp from which the head and swimmerettes, and preferably the sand vein, have been removed. The illustrated shrimp body 12 includes six segments 21-26, with tail 30 being connected to first segment 21. Segments 21-26 comprise a curved tubular shell 40 that enclose the meat 42 which is the ultimate food item that is consumed. The shell includes a convex dorsal side 50 and a concave ventral side 52. In the FIGURE, the meat 42 is shown extending part way out of the last segment 26. It will be understood that the number of segments may vary from one shrimp species to the next.

In accordance with the present invention, two cuts are made in shell 40: ventral cut 60 and tail cut 62. Ventral cut 60 extends along ventral side 52 of shell 40, from first segment 21 at least through the second to last segment 25, and preferably through about two-thirds of the last segment 26. The ventral cut should not extend all the way through last segment 26, otherwise the meat will expand during further processing, leading to an undesirable product configuration. Tail cut 62 extends from the ventral side of segment 21 adjacent to joint 70 at which the ventral side of tail 30 extends from segment 21, and extends for a relatively short distance at about a 45 degree angle with respect to ventral cut 60. Preferably, the length of the tail cut is about one-third the length of the first segment 21. In combination, it has been found that the ventral and tail cuts permit very easy removal of the shell by the ultimate consumer or in a restaurant or the like. In particular, the tail cut facilitates snapping off the tail of the shrimp, while the consumer can readily separate the remaining uncut portion of last segment 26, fold back the shell, and remove the meat.

While the preferred embodiments of the invention have been illustrated and described, variations will be apparent to those skilled in the art. Accordingly, the scope of the invention is to be determined by reference to the following claims.

The embodiments of the invention in which an exclusive property or privilege is claimed are defined as follows:

1. A process for preparing shrimp, each shrimp having a head, a body having dorsal and ventral sides and a shell enclosing the body, the body having a plurality of interconnected segments including a first segment to which a tail is attached, a last segment closest to the head, and a second to last segment adjacent to the last segment, the process comprising:

creating a ventral cut in the shell along the ventral side, the ventral cut extending from the first segment at least through the second to last segment; and creating a tail cut in the side of the first segment, the tail cut extending from adjacent the tail and making an acute angle with the ventral cut.

2. The process of claim 1, wherein the ventral cut extends through a portion of the last segment.

3. The process of claim 2, wherein said portion is approximately equal to two-thirds of the length of the last segment.

4. The process of claim 1, wherein said acute angle is approximately 45 degrees.

5. The process of claim 4, wherein the length of the tail cut is approximately one-third the length of the first segment.

* * * * *